(12) United States Patent  (10) Patent No.: US 9,734,787 B2
Chang et al.  (45) Date of Patent: Aug. 15, 2017

(54) METHOD FOR OPERATING MOBILE ELECTRONIC DEVICE, MOBILE ELECTRONIC DEVICE, AND COMPUTER READABLE MEDIUM USING THE SAME

(71) Applicant: HTC Corporation, Taoyuan (TW)

(72) Inventors: Chia-Lin Chang, Taoyuan (TW); Bo-Han Lin, Taoyuan (TW); Ting-An Chien, Taoyuan (TW)

(73) Assignee: HTC Corporation, Taoyuan (TW)

( * ) Notice: Subject to any disclaimer, the term of this patent is extended or adjusted under 35 U.S.C. 154(b) by 96 days.

(21) Appl. No.: 14/586,966

(22) Filed: Dec. 31, 2014

(65) Prior Publication Data

US 2016/0188023 A1 Jun. 30, 2016

(51) Int. Cl.
*G06F 3/041* (2006.01)
*G09G 5/00* (2006.01)
(Continued)

(52) U.S. Cl.
CPC ............ *G09G 5/003* (2013.01); *G06F 3/017* (2013.01); *G06F 21/32* (2013.01); *G06K 9/00013* (2013.01); *G09G 2330/022* (2013.01)

(58) Field of Classification Search
CPC .......... G06F 21/32; G06F 21/31; G06F 21/44; G06F 3/017; G06F 3/041; G06K 9/00013; G09G 2330/022; G09G 5/003
(Continued)

(56) References Cited

U.S. PATENT DOCUMENTS 6,950,539 B2 * 9/2005 Bjorn .................. G06F 3/03547
345/157
7,809,168 B2 * 10/2010 Abiko ................. G06F 3/03547
382/115
(Continued)

FOREIGN PATENT DOCUMENTS

TW 201322142 6/2013

OTHER PUBLICATIONS

"Office Action of German Counterpart Application", issued on Mar. 4, 2016, p. 1-p. 9.
(Continued)

*Primary Examiner* — Michael J Jansen, II
(74) *Attorney, Agent, or Firm* — Jianq Chyun IP Office

(57) ABSTRACT

The disclosure provides a method, mobile electronic device, and computer readable medium for operating the mobile electronic device having a motion sensor, touch sensor, microcontroller, and processor. The method includes the following steps. The motion sensor detects a motion and generates motion data in response to the detected motion. The touch sensor detects a fingerprint and generates fingerprint data in response to the detected fingerprint. The microcontroller compares the generated motion data with enrolled motion data, and one of the microcontroller and the processor compares the generated fingerprint data with enrolled fingerprint data, where the enrolled fingerprint data and the enrolled motion data including the first motion data are prestored in the mobile electronic device. When the generated motion data matches the first motion data and the generated fingerprint data matches the enrolled fingerprint data, the processor performs a first action in associated with the first motion data.

16 Claims, 7 Drawing Sheets

(51) Int. Cl.
*G06K 9/00* (2006.01)
*G06F 3/01* (2006.01)
*G06F 21/32* (2013.01)

(58) Field of Classification Search
USPC .................................................. 345/173
See application file for complete search history.

(56) References Cited

U.S. PATENT DOCUMENTS

| | | | | |
|---|---|---|---|---|
| 8,413,232 B2* | 4/2013 | Bae | ........................ | G06F 21/32 726/19 |
| 8,443,199 B2* | 5/2013 | Kim | .................... | G06F 3/03547 345/173 |
| 8,560,004 B1 | 10/2013 | Tsvetkov et al. | | |
| 8,605,960 B2* | 12/2013 | Orsley | .................. | G06F 3/0421 382/124 |
| 8,810,367 B2* | 8/2014 | Mullins | .................... | G06F 21/32 340/5.53 |
| 8,811,948 B2* | 8/2014 | Bandyopadhyay | ... | G06F 1/1643 345/173 |
| 8,902,154 B1* | 12/2014 | Kahn | ...................... | G06F 3/017 345/156 |
| 8,914,875 B2* | 12/2014 | Matus | ...................... | G06F 21/32 455/411 |
| 9,204,298 B2* | 12/2015 | Frew | ...................... | H04L 9/3215 |
| 9,256,715 B2* | 2/2016 | Draluk | ................ | G06F 21/00 |
| 9,298,900 B2* | 3/2016 | Davis | .................... | G06F 21/316 |
| 9,330,322 B2* | 5/2016 | Ferren | ................ | G02B 13/0065 |
| 2003/0051181 A1* | 3/2003 | Magee | .................. | G06F 1/3203 713/320 |
| 2006/0078176 A1* | 4/2006 | Abiko | .................. | G06F 3/03547 382/124 |
| 2007/0008066 A1* | 1/2007 | Fukuda | ............... | G06F 3/03547 340/5.52 |
| 2007/0140533 A1* | 6/2007 | Hsieh | .................. | G06F 3/03543 382/124 |
| 2009/0224874 A1* | 9/2009 | Dewar | .................... | G06F 21/32 340/5.53 |
| 2010/0220900 A1* | 9/2010 | Orsley | .................. | G06F 3/0421 382/124 |
| 2010/0240415 A1* | 9/2010 | Kim | .................... | G06F 3/03547 455/565 |
| 2011/0138459 A1* | 6/2011 | Bae | ........................ | G06F 21/32 726/19 |
| 2012/0009896 A1* | 1/2012 | Bandyopadhyay | ... | G06F 1/1643 455/411 |
| 2013/0036462 A1* | 2/2013 | Krishnamurthi | ........ | G06F 21/32 726/19 |
| 2013/0067551 A1* | 3/2013 | Frew | ...................... | H04L 9/3215 726/7 |
| 2013/0076485 A1* | 3/2013 | Mullins | .................... | G06F 21/32 340/5.83 |
| 2013/0129162 A1* | 5/2013 | Cheng | .................... | G06F 21/32 382/124 |
| 2013/0239206 A1* | 9/2013 | Draluk | .................... | G06F 21/00 726/19 |
| 2013/0324089 A1 | 12/2013 | Kim et al. | | |
| 2014/0101737 A1 | 4/2014 | Rhee | | |
| 2014/0123253 A1* | 5/2014 | Davis | .................... | G06F 21/316 726/6 |
| 2014/0123273 A1* | 5/2014 | Matus | ...................... | G06F 21/32 726/17 |
| 2014/0184549 A1* | 7/2014 | Cheng | .................... | G06F 21/32 345/173 |
| 2014/0245408 A1* | 8/2014 | Ballapalle | ............... | G06F 21/88 726/6 |
| 2015/0150121 A1* | 5/2015 | Ferren | ................ | G02B 13/0065 726/19 |
| 2015/0205993 A1* | 7/2015 | Han | .................... | G06K 9/00013 345/173 |
| 2015/0242696 A1* | 8/2015 | Kim | ...................... | G06F 3/0416 345/173 |
| 2015/0319294 A1* | 11/2015 | Sudhir | .............. | H04M 1/72577 455/411 |
| 2015/0324570 A1* | 11/2015 | Lee | ...................... | G06K 9/3208 382/124 |
| 2015/0347730 A1* | 12/2015 | Matus | ...................... | G06F 21/32 726/19 |
| 2015/0371073 A1* | 12/2015 | Cho | ...................... | G06F 3/0488 382/124 |
| 2016/0026884 A1* | 1/2016 | Ferren | ................ | G02B 13/0065 382/118 |
| 2016/0034901 A1* | 2/2016 | Ferren | ................ | G02B 13/0065 705/44 |

OTHER PUBLICATIONS

"Office Action of Taiwan Counterpart Application", issued on May 9, 2016, p. 1-p. 13.

* cited by examiner

METHOD FOR OPERATING MOBILE ELECTRONIC DEVICE, MOBILE ELECTRONIC DEVICE, AND COMPUTER READABLE MEDIUM USING THE SAME

TECHNICAL FIELD

The disclosure relates to a method for operating a mobile electronic device, a mobile electronic device and a computer readable medium using the same.

BACKGROUND

A handheld mobile electronic device such as a smart phone has become multi-purpose oriented as data processing, personal organizing, entertainment, and communication features are integrated into one portable pocket-sized computer system. The versatility of such device has enabled users to explore an increasing variety of applications.

Due to the confidential nature of applications stored in such device, a security feature could be provided to prevent unauthorized access to run applications with crucial or confidential data such as eWallet, e-mail, phonebook, and so forth. For example, the device could be automatically locked and placed into a low-power sleep mode after a period of inactivity. To regain access to any of the applications, the user may wake up the device by pressing a power button or a home button, and an authentication mechanism is initiated such that the user is required to unlock the screen. For example, an entry field as well as an alphabetic and/or numeric keyboard may be displayed on the screen. Thereafter, the user may be prompted to enter a personal identification number (PIN) or a password. Other known unlocking approaches typically involve drawing a predefined unlocking pattern or the use of a biometric scanner for fingerprints. After the device is successfully unlocked, the user may select and launch a desired application by tapping on its associated icon or widget presented on a home screen or a desktop.

One drawback of this implementation is that the entered PIN or password may be visible to others while the user enters it. Also, the password or the unlocking pattern may need certain complexity in order to comply with the security requirement, and yet the entire unlocking procedure may be tedious and time-consuming. Moreover, in some instances the device may store many applications, and searching for a specific application by navigating from the desktop or multiple screen pages may be cumbersome.

SUMMARY OF THE DISCLOSURE

Accordingly, the disclosure is directed to a method for operating a mobile electronic device, a mobile electronic device and a computer readable medium using the same, which provides an approach to operate a mobile electronic device in a more direct, efficient, and secure fashion.

According to one of the exemplary embodiments, the present disclosure is directed to a method for operating a mobile electronic device having a motion sensor, a touch sensor, a microcontroller, and a processor. The method would include at least but not limited to the following steps. A motion is detected by the motion sensor, and fingerprint is detected by the touch sensor. Motion data is generated by the motion sensor in response to the detected motion, and fingerprint data is generated by the touch sensor in response to the detected fingerprint. The generated motion data is compared with at least one piece of enrolled motion data by the microcontroller, and the generated fingerprint data is compared with enrolled fingerprint data by one of the microcontroller and the processor, where the enrolled motion data and the enrolled fingerprint data are prestored in the mobile electronic device, and where the enrolled motion data includes first motion data. A first action in associated with the first motion data is performed by the processor when the generated motion data matches the first motion data and the generated fingerprint data matches the enrolled fingerprint data.

According to one of the exemplary embodiments, the present disclosure is directed to a mobile electronic device. The mobile electronic device would at least, but not limited to, a motion sensor, a touch sensor, a microcontroller, and a processor, where the microcontroller is electronically coupled to the motion sensor and the touch sensor, and where the processor is coupled to the microcontroller. The motion sensor is configured to detect a motion and generate motion data in response to the detected motion. The touch sensor is configured to detect a fingerprint and generate fingerprint data in response to the detected fingerprint. The microcontroller is configured to compare the generated motion data with at least one piece of enrolled motion data. One of the microcontroller and the processor is configured to compare the generated fingerprint data with enrolled fingerprint data, where the enrolled motion data and the enrolled fingerprint data are prestored in the mobile electronic device, and where the enrolled motion data includes first motion data. The processor is configured to perform a first action in associated with the first motion data when the generated motion data matches the first motion data and the generated fingerprint data matches the enrolled fingerprint data.

According to one of exemplary embodiments, the present disclosure is also directed to a non-transitory computer readable medium, which records computer program to be loaded into a mobile electronic device to execute the steps of the aforementioned operating method. The computer program is composed of a plurality of program instructions (for example, an organization chart, establishing program instruction, a table approving program instruction, a setting program instruction, and a deployment program instruction, etc), and these program instructions are loaded into the mobile electronic device and executed by the same to accomplish various steps of the method for operating the mobile electronic device.

In view of the aforementioned descriptions, fingerprint data and at least one piece of motion data may be enrolled in the mobile electronic device in the disclosure, where each piece of the motion data is designated to a different action to be performed on the mobile electronic device. Once the user desires to perform a specific action on the mobile electronic device, fingerprint authentication in conjunction with motion authentication are requested to the user to deter an unauthorized access to run the application. Upon the validation of the authentication, the specific action will be automatically performed. The disclosure not only obviates the need to navigate through all the objects and/or multiple pages, but also provides a more secure and elegant approach to operate a mobile electronic device.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
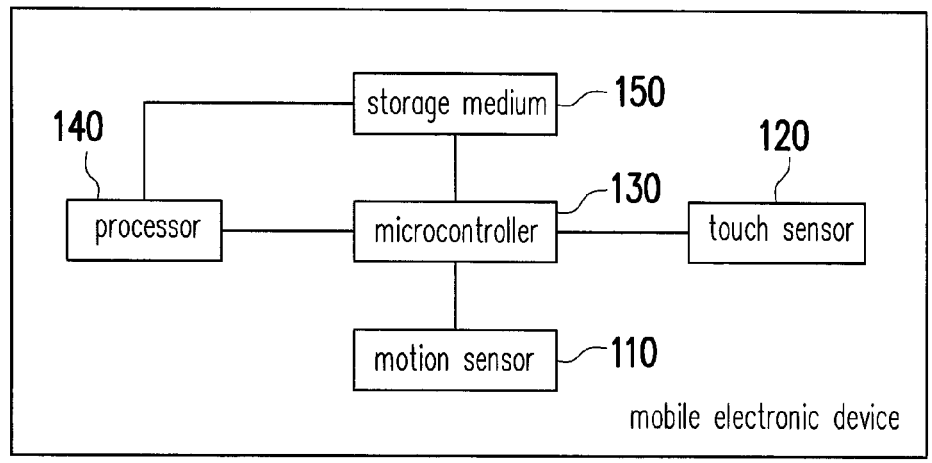
FIG. 1 illustrates a schematic diagram of a proposed mobile electronic device in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Fingerprints possess a high level of reliability and have been extensively used for security purposes. Motion gestures provide an efficient way for obviating the need to physically and directly click on on-screen items when operating an electronic device. The main concept of the disclosure is to associate each motion gesture with a different action to be performed on a mobile electronic device. Once the user of the mobile electronic device desires to perform a specific action such as launching a specific application, fingerprint authentication in conjunction with motion authentication are requested to the user to deter an unauthorized access to run the application. Embodiments of the disclosure are illustrated and described in detail hereinafter.

FIG. 1 illustrates a schematic diagram of a proposed mobile electronic device in accordance with one of the exemplary embodiments of the disclosure. All components of the mobile electronic device and their configurations are first introduced in FIG. 1. The functionalities of the components are disclosed in more detail in conjunction with FIG. 2.

Referring to FIG. 1, an exemplary mobile electronic device 100 would include a motion sensor 110, a touch sensor 120, a microcontroller 130, a processor 140, and a storage medium 150. The mobile electronic device 100 could be a smart phone, a mobile phone, a person digital assistant (PDA), a tablet, a digital reader, and so forth.

The motion sensor 110 may be one or a combination of an accelerometer (e.g. G-sensor), a gyroscope (e.g. gyro-sensor), or any sensor that detects the linear movement, the direction of the linear movement, or the rotational movement of the mobile electronic device 100. For example, a three-axis accelerometer would output acceleration data corresponding to each axis in response to any detection of a sudden movement when the mobile electronic device 100 is applied with an external force. A gyroscope would detect a rotational movement of the mobile electronic device 100 rotating about a particular axis in space and output data representing the rotational movement (e.g., rotational angular velocity or rotational angle). A combination of the accelerometer and the gyroscope may crate a more accurate measurement of an overall movement and orientation of the mobile electronic device 100.

The touch sensor 120 may include an optical fingerprint scanner, a semiconductor fingerprint scanner, or integrated as a part of a touch screen with a fingerprint scanning feature. Also, the touch sensor 120 may be an area-type fingerprint sensor for detecting a fingerprint of a fingertip stationarily placed thereon or a sweep-type fingerprint sensor for detecting a fingerprint of a fingertip sweeping thereacross. Fingerprint data generated from the detected fingerprint may include fingerprint identification points used in identifying a fingerprint.

It should be noted that, those of skill in the art would recognize that a processing circuitry may be incorporated into the integrated circuit of the motion sensor 110 and the touch sensor 120 or may be included in the associated circuitry within an overall motion sensor module and an overall touch sensor module for generating data preceded by any detection.

The microcontroller 130 may be a sensor hub electrically coupled to the motion sensor 110 and the touch sensor 120. The microcontroller 130 is configured to integrate and process data obtained from the motion sensor 110 and the touch sensor 120 with relatively low-power consumption.

The processor 140 may include one or more of a North Bridge, a South Bridge, a field programmable array (FPGA), a programmable logic device (PLD), an application specific integrated circuit (ASIC), or other similar device or a combination thereof. The processor 140 may also include a central processing unit (CPU), a programmable general purpose or special purpose microprocessor, a digital signal processor (DSP), a graphics processing unit (GPU), an application specific integrated circuit (ASIC), a programmable logic device (PLD), or other similar device or a combination thereof. The processor 140 would be electrically coupled to the microcontroller 130.

The storage medium 150 may include various forms of non-transitory, volatile, and non-volatile memories which would store buffered or permanent data such as motion data, fingerprint data, and compiled programming codes used to execute functions of the exemplary mobile electronic device 100. The storage medium 150 may be external or internal to the microcontroller 130 and accessible by the microcontroller 130 and the processor 140.

Figure 2:
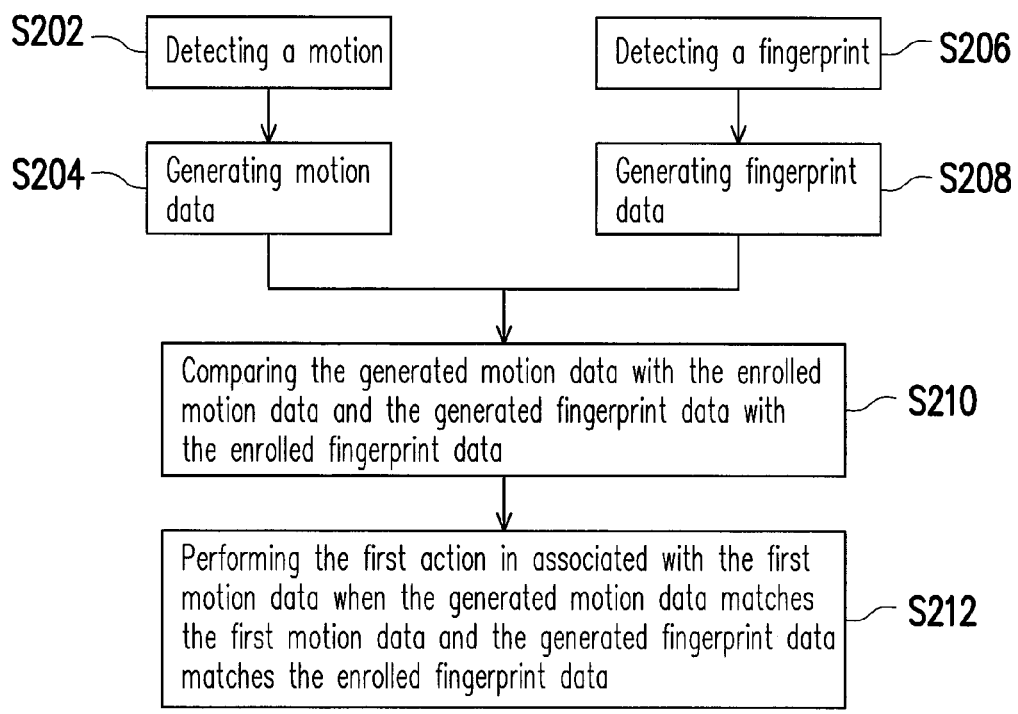
FIG. 2 illustrates a proposed operating method for a mobile electronic device in accordance with one of the exemplary embodiments of the disclosure.

FIG. 2 illustrates a proposed operating method for a mobile electronic device in accordance with one of the exemplary embodiments of the disclosure. The steps of FIG. 2 could be implemented by the proposed mobile electronic device 100 as illustrated in FIG. 1.

Referring to FIG. 2, the motion sensor 110 detects a motion (Step S202) and generates motion data in response to the detected motion (Step S204). The motion sensor 110 may constantly detect the presence of the motion that is indicative of the mobile electronic device 100 being moved. Once the motion is detected, the motion sensor 110 may generate and transmit the motion data corresponding to the movement of the mobile electronic device 100 to the microcontroller 130.

Concurrent to the detection of the motion, the touch sensor 120 detects a fingerprint (Step S206) and generates fingerprint data in response to the detected fingerprint (Step S208). The touch sensor 120 may detect the proximity of a finger and generate an image of the fingerprint while the user places the fingertip on the touch sensor 120 or swipes the fingertip across the touch sensor 120.

It should be noted that, prior to the detection of any motion and fingerprint, the user of the mobile electronic device 100 may register his/her fingerprint data by placing the fingertip on the touch sensor 120 or swiping the fingertip across the touch sensor 120. The touch sensor 120 may generate the corresponding fingerprint data, and the processor 140 may enroll the corresponding fingerprint data in the storage medium 150 as a fingerprint database. In an embodiment, the storage medium 150 may even store more than one piece of enrolled fingerprint data. Moreover, the mobile electronic device 100 may provide the user to define a plurality of motion gestures associated with predefined actions of the mobile electronic device 100. In other words, the motion sensor 110 may generate the motion data upon the detection of the motion, and the processor 140 may enroll and map the motion data to an action as well as store the motion data in the storage medium 150 as a motion database. In the present exemplary embodiment, the enrolled motion data includes first motion data in associated with a first action.

Next, the microcontroller 130 compares the generated motion data with the enrolled motion data, and one of the microcontroller 130 and the processor 140 compares the generated fingerprint data with the enrolled fingerprint data (Step S210). To be specific, the microcontroller 130 may compare the generated motion data with the enrolled motion data stored in the storage medium 150 and determine if they match within some predetermined tolerance level. The microcontroller 130 or the processor 140 may compare the generated fingerprint data with the enrolled fingerprint data stored in the storage medium 150 and determine if they match by leveraging a fingerprint matching algorithm. For example, minutiae information or other ridge features such as ridge directions, ridge shapes, ridge spacing may be used to determine whether two fingerprints are from the same finger.

In one exemplary embodiment, the microcontroller 130 may concurrently or sequentially compares the generated motion data with the enrolled motion data and the generated fingerprint data with the enrolled fingerprint data. In another exemplary embodiment where the fingerprint matching algorithm may require a high performance architecture, the microcontroller 130 may first compare the generated motion data with the enrolled motion data, and the processor 140 may next compare the generated fingerprint data with the enrolled fingerprint data. The disclosure is not limited herein.

When the generated motion data matches first motion data and the generated fingerprint data matches the enrolled fingerprint data, the processor 140 performs the first action in associated with the first motion data (Step S212). In other words, in responsive to a successful authentication of the generated motion data and the generated fingerprint data, the processor 140 would perform the first action. From another point of view, when the generated fingerprint data does not match any of the enrolled fingerprint data or the generated motion data does not match the first motion data, the first action would not be performed by the processor 140.

Figure 3A:
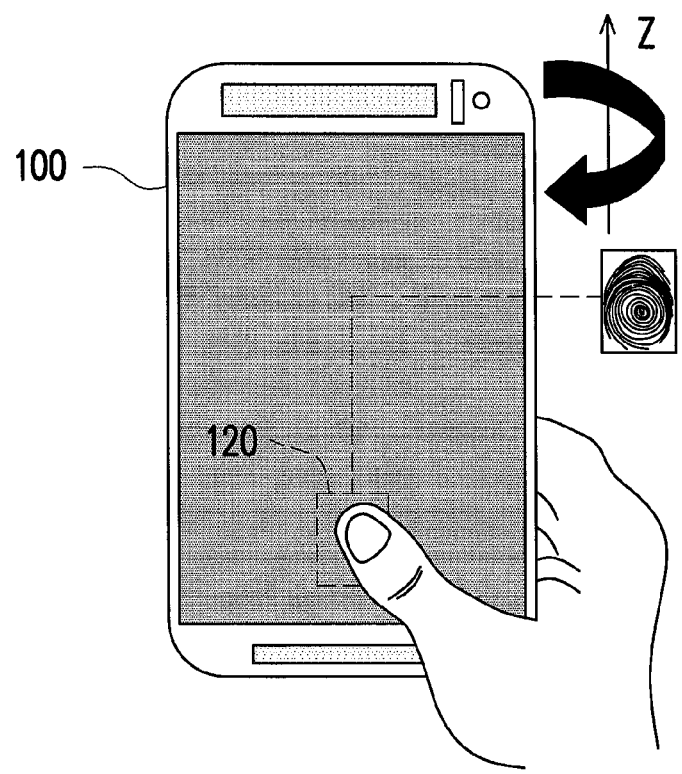
FIGS. 3A and 3B illustrate a scenario of operating the mobile electronic device 100 in accordance with one of the exemplary embodiments of the disclosure.
Figure 3B:
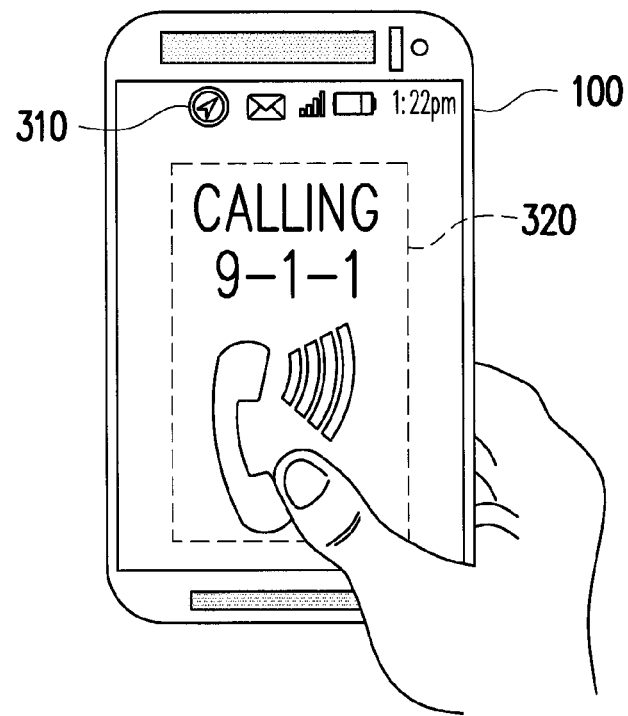

FIGS. 3(*a*) and 3(*b*) illustrate a scenario of operating the mobile electronic device 100 in accordance with one of the exemplary embodiments of the disclosure. In the present exemplary embodiment, during a fingerprint enrollment process, the user may register his/her fingerprint into the mobile electronic device 100. The user may also hold the mobile electronic device 100 with a 180-degree counter-clockwise rotation along an axis vertical to the ground and define such motion gesture as an action of placing a 9-1-1 emergency call in conjunction with turning on a GPS.

Although a conventional procedure to place a 9-1-1 call seems to be straightforward, it becomes much more difficult when it must be accomplished during a stressful emergency situation. In the present exemplary embodiment, referring to FIG. 3, the user may either concurrently or sequentially place the fingertip on the touch sensor 120 of the mobile electronic device 100 and hold the mobile electronic device 100 with a 180-degree counter-clockwise rotation along an axis Z vertical to the ground. After the microcontroller 130 authenticates the detected fingerprint and the detected motion gesture, the processor 140 may initiate a 9-1-1 call 320 and launch a GPS application 310. Therefore, in this instance, the mobile electronic device 100 is not only simple and straightforward to operate, but also minimize any potential danger in a time-critical situation.

Figure 4:
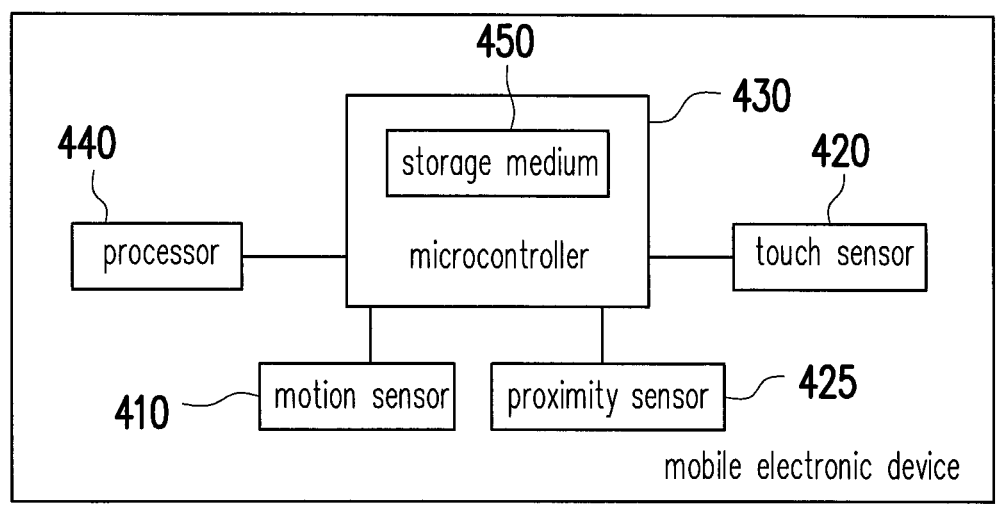
FIG. 4 illustrates a schematic diagram of another proposed mobile electronic device in accordance with one of the exemplary embodiments of the disclosure.

FIG. 4 illustrates a schematic diagram of a proposed mobile electronic device in accordance with another of the exemplary embodiments of the disclosure.

Referring to FIG. 4, a mobile electronic device 400 would include a motion sensor 410, a touch sensor 420, a proximity sensor 425, a microcontroller 430, a processor 440, and a storage medium 450, wherein similar components to FIG. 1 are designated with similar numbers having a "4" prefix.

The proximity sensor 425 may be an infrared proximity sensor, an inductive proximity sensor, an ultrasonic proximity sensor, a capacitive proximity, and so forth. The proximity sensor 425 may detect the location of an arbitrary object relative to the mobile electronic device 400. The proximity sensor 425 would be electrically coupled to the microcontroller 430.

In the present exemplary, enrolled motion data and enrolled fingerprint data are stored in the storage medium 450 integrated in the microcontroller 430.

Figure 5:
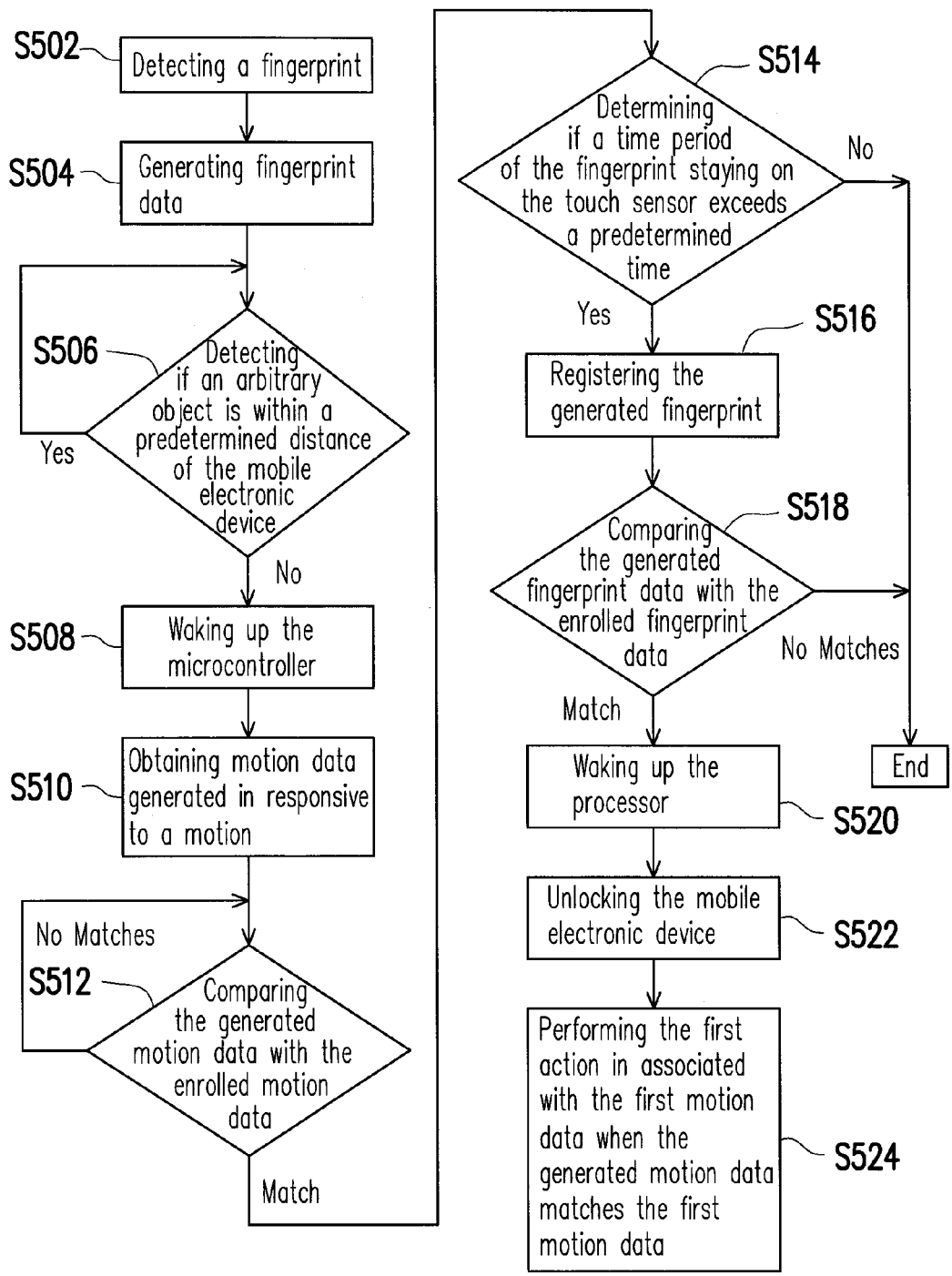
FIG. 5 illustrates another proposed operating method for a mobile electronic device in accordance with one of the exemplary embodiments of the disclosure.

FIG. 5 illustrates an operating method of a mobile electronic device in accordance with one of the exemplary embodiments of the disclosure. The steps of FIG. 5 could be implemented by the mobile electronic device 400 as illustrated in FIG. 4. In the present exemplary embodiment, the mobile electronic device 400 may assume to be initially in a device's sleep mode, where both the microcontroller 430 and the processor 440 both are operated in a low-power state (referred to as "a microprocessor's sleep mode" and "a processor's sleep mode" respectively) after the mobile electronic device 400 has been idle for a period of time. Also, in the scenario illustrated in the present embodiment, a fingerprint is detected prior to the detection of a motion.

Referring to FIG. 5, the touch sensor 420 may first detect a fingerprint (Step S502) and generate fingerprint data in response to the detected fingerprint (Step S504). The touch sensor 420 may first detect the proximity of a finger and trigger a fingerprint engine (not shown) of the touch sensor 420 while the user places the fingertip on the touch sensor 420 or swipes the fingertip across the touch sensor 420. Meanwhile, the touch sensor 420 may generate fingerprint image data including all fingerprint touch characteristics.

In some instances, false fingerprint detection may occur due to various incidental motions. For example, the user may carry or transport the mobile electronic device 400 in a pocket, a purse, a backpack, and etc. When the user tries to find a particular item from, for example, a backpack, the touch sensor 420 may be unintentionally touched by the user and trigger a false response. Hence, the proximity sensor 425 detects if an arbitrary object is within a predetermined distance of the mobile electronic device 400 (Step S506) for further assurance, where the predetermined distance takes a non-zero positive value such as 3 cm. The proximity sensor 425 may thus determine whether the mobile electronic device 400 in a closed area such as a pocket as alluded above.

If the proximity sensor 425 does not detect the existence of the arbitrary object, the proximity sensor 425 would wake up the microcontroller 430 (Step S508) by, for example, transmitting an interrupt signal thereto. If the proximity sensor 425 detects the arbitrary object, the proximity sensor 425 would not wake up the microcontroller 430, and all the generated fingerprint data would be discarded. In one scenario, the user may take the mobile electronic device 400 out from the backpack. Hence, the fingerprint engine may be still activated for a while and the proximity sensor 425 may continue detecting if the ambient condition has been changed. In other words, the proximity sensor 425 may detect if the mobile electronic device 400 is departed from the backpack. In an exemplary embodiment, the fingerprint engine may be deactivated if the ambient condition remains the same after a period of time.

Moreover, the motion sensor 410 may detect a motion and generate motion data in response to the detected motion. The motion sensor 410 may constantly detect the presence of the motion that is indicative of the mobile electronic device 400 being moved. Once the motion is detected, the motion sensor 410 may generate the motion data corresponding to the movement of the mobile electronic device 400. It should be noted that, the motion sensor 410 may detect the motion and generate the motion data at any point either before or after the microcontroller 430 is awakened, the disclosure is not limited herein.

In the present exemplary embodiment, upon activation from the microcontroller's sleep mode, the microcontroller 430 obtains the motion data from the touch sensor 420 (Step S510) and compares the generated motion data with the enrolled motion data (Step S512). In the same manner as described previously with respect to the exemplary embodiment in FIG. 2, the detailed description of Step S512 will not be repeated herein.

In some instances, the user may accidentally perform a wrong motion gesture that does not match any enrolled data, or the motion gesture may not be precise within a tolerance range. In the present exemplary embodiment, if the generated motion data does not match the enrolled motion data, the microcontroller 430 may continue receiving new generated motion data from the motion sensor 410 and comparing the new generated motion data with the enrolled motion data for a period of time.

If the generated motion data matches first motion data of the enrolled motion data, based on the generated fingerprint data, the microcontroller 430 would determine if a time period of the fingerprint staying on the touch sensor 420 exceeds a predetermined time (Step S514) for double assurance that the mobile electronic device 400 is not accidentally touched and moved by the user. The predetermined time takes a non-zero value such as 1 second. If the time period of the fingerprint staying on the touch sensor 420 does not exceed the predetermined time, the fingerprint engine may be deactivated.

If the time period of the fingerprint staying on the touch sensor 420 exceeds the predetermined time, the microcontroller 430 would register the generated fingerprint data (Step S516) for a follow-up authentication process. That is, the microcontroller 430 compares the generated fingerprint data with the enrolled fingerprint data (Step S518). In the same manner as described previously with respect to the exemplary embodiment in FIG. 2, the detailed description of Step S518 will not be repeated herein.

It should be noted that, since the processing time required for motion gesture recognition is faster than that for fingerprint recognition, Step S512 is followed by Steps S514-S518 in the present exemplary embodiment. In other exemplary embodiments, Steps S514-S518 may be performed prior to Step S512. The disclosure is not limited herein.

If the generated fingerprint data does not match the enrolled fingerprint data, i.e., the authentication process fails, the fingerprint engine may be deactivated. If the generated fingerprint data matches the enrolled fingerprint data, the microcontroller 430 would wake up the processor 440 (Step S520), and the processor 440 would unlock the mobile electronic device 400 (Step S522). The processor 440 would perform the first action in associated with the first motion data when the generated motion data matches the first motion data (Step S524). Specifically, the microcontroller 430 may wake up the processor 440 by transmitting an interrupt signal. After the processor 440 is awakened from the processor's sleep mode, the processor 440 may turn on a display (not shown), unlock the mobile electronic device 400, and perform the first action in associated with the enrolled first motion data. In the same manner as also described previously with respect to the exemplary embodiment in FIG. 2, the detailed description of Step S524 will not be repeated herein.

Figure 6:
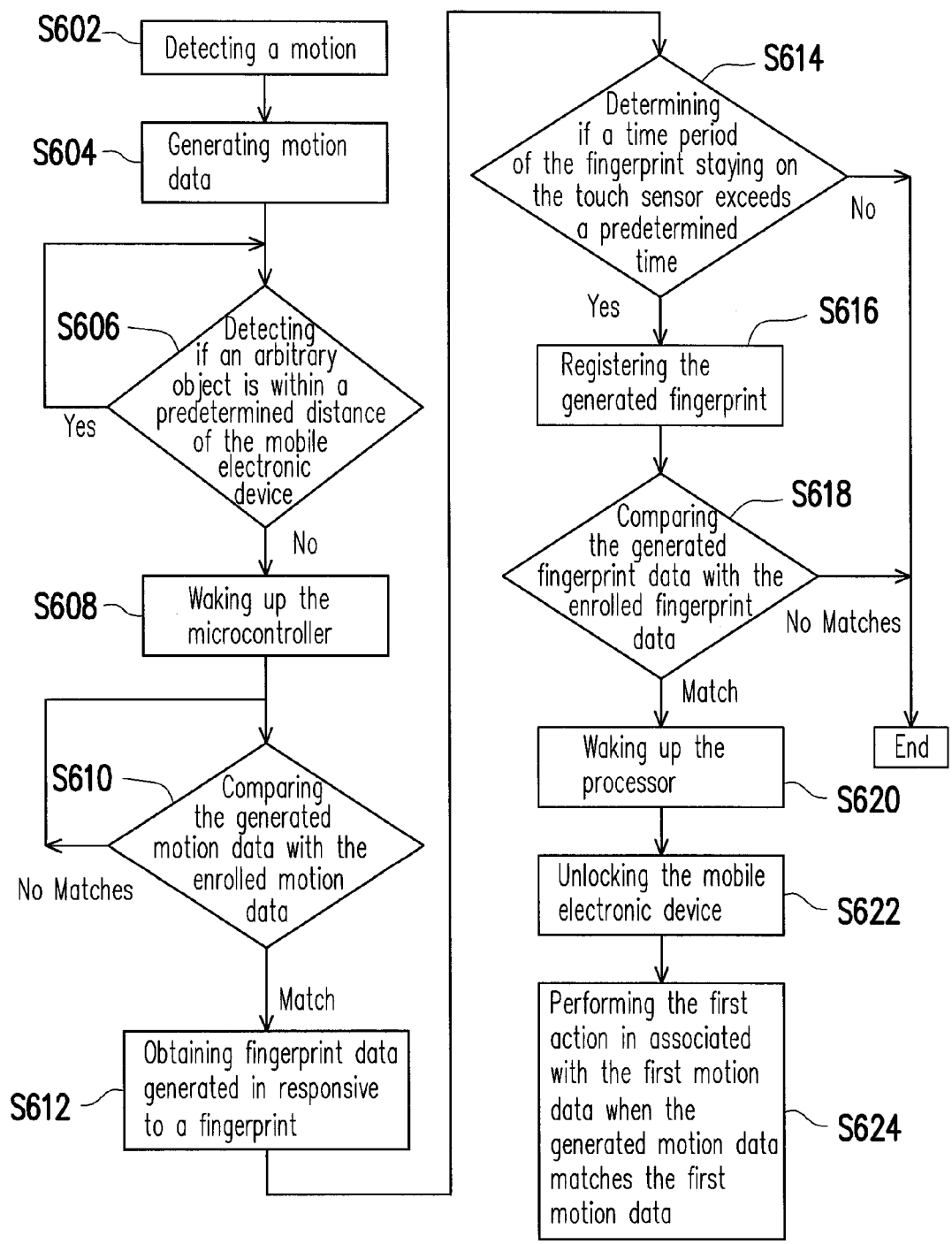
FIG. 6 illustrates another proposed operating method for a mobile electronic device in accordance with one of the exemplary embodiments of the disclosure.

FIG. 6 illustrates another operating method of a mobile electronic device in accordance with one of the exemplary embodiments of the disclosure. The steps of FIG. 6 could be implemented by the mobile electronic device 400 as illustrated in FIG. 4 as well. In the present exemplary embodiment, the microcontroller 430 and the processor 440 are initially in the microprocessor's sleep mode and the processor's sleep mode respectively. In the scenario illustrated in the present embodiment, a motion is detected prior to the detection of a fingerprint. In other words, the user may first input a motion gesture prior to the fingerprint registration.

Referring to FIG. 6, the motion sensor 410 may detect a motion (Step S602) and generate motion data in response to the detected motion (Step S604). Next, the proximity sensor 425 detects if an arbitrary object is within a predetermined distance of the mobile electronic device 400 (Step S606). If the proximity sensor 425 does not detect the existence of the arbitrary object, the proximity sensor 425 would wake up the microcontroller 430 (Step S608) by, for example, transmitting an interrupt signal thereto. In the same manner as described previously with respect to the exemplary embodiment in FIG. 5, the detailed description of Steps S602-S608 will not be repeated herein.

If the proximity sensor 425 detects the arbitrary object, the proximity sensor 425 would continue detecting if the arbitrary object is departed from the mobile electronic device 400. In an exemplary embodiment, if the ambient condition remains the same after a period of time, all the generated motion data would be discarded.

Moreover, the touch sensor 420 may detect a fingerprint and generate fingerprint data in response to the detected fingerprint. It should be noted that, the touch sensor 420 may detect the fingerprint and generate the fingerprint data at any point either before or after the microcontroller 430 is awakened, the disclosure is not limited herein.

In the present exemplary embodiment, upon activation from the microcontroller's sleep mode, the microcontroller 430 compares the generated motion data with the enrolled motion data (Step S610). If the generated motion data matches first motion data of the enrolled motion data, the microcontroller 430 would obtain the generated fingerprint data (Step S612) and determine if a time period of the fingerprint staying on the touch sensor 420 exceeds a predetermined time (Step S614) for double assurance that the mobile electronic device 400 is not accidentally touched and moved by the user. If the time period of the fingerprint staying on the touch sensor 420 exceeds the predetermined time, the microcontroller 430 would register the generated fingerprint data (Step S616) for a follow-up authentication process. That is, the microcontroller 430 compares the generated fingerprint data with the enrolled fingerprint data (Step S618). If the generated fingerprint data does not match the enrolled fingerprint data, i.e., the authentication process fails, the fingerprint engine may be deactivated. If the generated fingerprint data matches the enrolled fingerprint data, the microcontroller 430 would wake up the processor 440 (Step S620), and the processor 440 would unlock the mobile electronic device 400 (Step S622). The processor 440 would perform the first action in associated with the first motion data when the generated motion data matches the first motion data (Step S624). In the same manner as described previously with respect to the exemplary embodiment in FIG. 5, the detailed description of Steps S614-S624 will not be repeated herein.

Figure 7:
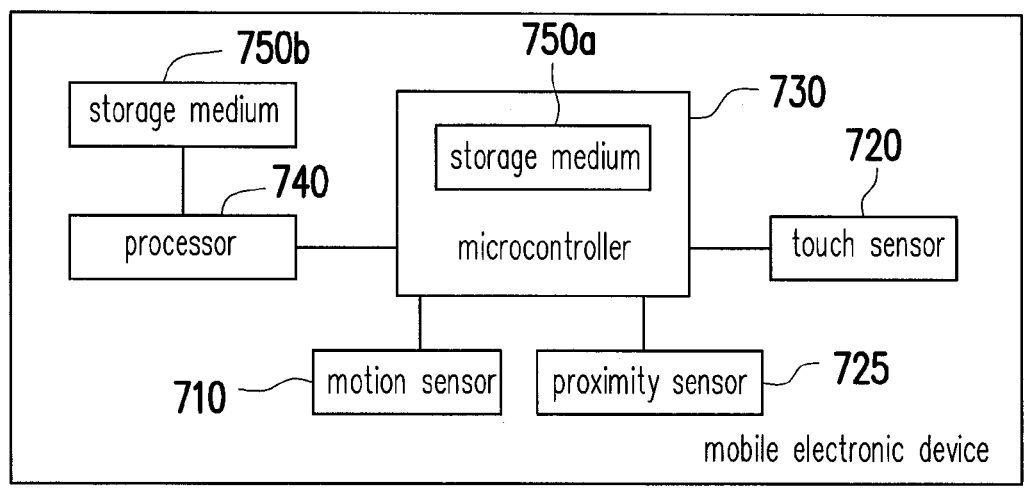
FIG. 7 illustrates a schematic diagram of another proposed mobile electronic device in accordance with one of the exemplary embodiments of the disclosure.

FIG. 7 illustrates a schematic diagram of another proposed mobile electronic device in accordance with another of the exemplary embodiments of the disclosure.

Referring to FIG. 7, a mobile electronic device 700 would include a motion sensor 710, a touch sensor 720, a proximity sensor 725, a microcontroller 730, a processor 740, a storage medium 750a, and a storage medium 750b, wherein similar components to FIG. 1 are designated with similar numbers having a "7" prefix.

In the present exemplary, enrolled motion data is stored in the storage medium 750a integrated in the microcontroller 730, and the enrolled fingerprint data is stored in the storage medium 750b electrically connected to the processor 740.

Figure 8:
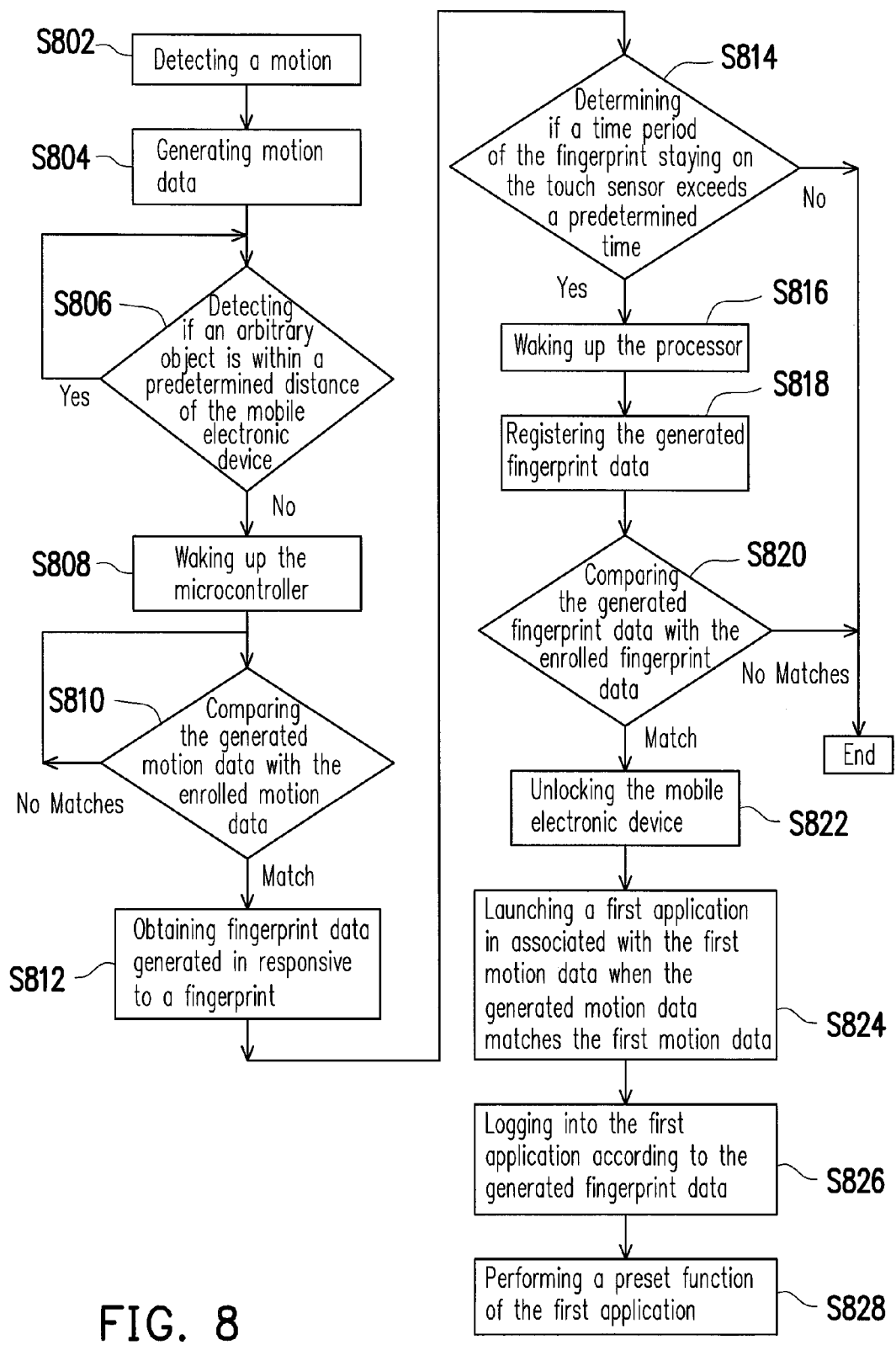
FIG. 8 illustrates another proposed operating method for a mobile electronic device in accordance with one of the exemplary embodiments of the disclosure.

FIG. 8 illustrates an operating method of a mobile electronic device in accordance with one of the exemplary embodiments of the disclosure. The steps of FIG. 8 could be implemented by the mobile electronic device 700 as illustrated in FIG. 7. In the present exemplary embodiment, the microcontroller 730 and the processor 740 are initially in a microprocessor's sleep mode and a processor's sleep mode respectively. The present exemplary embodiment is suitable for a scenario where, for example, more than one pieces of fingerprint data is enrolled, where all the enrolled fingerprint data is stored in the storage medium 750b connected to the processor 740. Moreover, a motion is detected prior to the detection of a fingerprint. It should be noted that, only the portion which is different from that previously mentioned will be described in detail and the remaining parts may be referred to the previous embodiments.

Referring to FIG. 8, the motion sensor 710 may detect a motion (Step S802) and generate motion data in response to the detected motion (Step S804). Next, the proximity sensor 725 detects if an arbitrary object is within a predetermined distance of the mobile electronic device 700 (Step S806). If the proximity sensor 725 does not detect the existence of the arbitrary object, the proximity sensor 725 would wake up the microcontroller 730 (Step S808) by, for example, transmitting an interrupt signal thereto. If the proximity sensor 725 detects the arbitrary object, the proximity sensor 725 would continue detecting if the arbitrary object is departed from the mobile electronic device 700. In an exemplary embodiment, if the ambient condition remains the same after a period of time, all the generated motion data would be discarded.

Moreover, the touch sensor 720 may detect a fingerprint and generate fingerprint data in response to the detected fingerprint. It should be noted that, the motion sensor 710 may detect the motion and generate the motion data at any point either before or after the microcontroller 730 is awakened, the disclosure is not limited herein.

Upon activation from the microcontroller's sleep mode, the microcontroller 730 compares the generated motion data with the enrolled motion data (Step S810). If the generated motion data matches first motion data of the enrolled motion data, the microcontroller 430 would obtain the generated fingerprint data from the touch sensor 720 (Step S812) and determine if a time period of the fingerprint staying on the touch sensor 420 exceeds a predetermined time (Step S814) for double assurance that the mobile electronic device 400 is not accidentally touched and moved by the user.

If the time period of the fingerprint staying on the touch sensor 720 exceeds the predetermined time, the microcontroller 730 would wake up the processor 740 (Step S816) by transmitting an interrupt signal, and the processor 740 would register the generated fingerprint data (Step S818) for a follow-up fingerprint recognition and authentication process. That is, the processor 740 compares the generated fingerprint data with the enrolled fingerprint data stored in the storage medium 750b (Step S820). If the generated fingerprint data does not match the enrolled fingerprint data, i.e., the authentication process fails, the fingerprint engine would be deactivated and the mobile electronic device 700 would remain locked.

In the present exemplary embodiment, assume that the generated motion data corresponds to launching an eWallet (referred to as a first application) and logging into the eWallet account for an eWallet transaction. Thus, if the generated fingerprint data matches the enrolled fingerprint data, the processor 740 would unlock the mobile electronic device 700 (Step S822) and launch a first application (Step S824). In this scenario, during the fingerprint enrolling process, the enrolled fingerprint data is associated with login information of the first application. The processor 740 then logs into the first application according to the generated fingerprint data (Step S826). Next, the processor 740 performs a preset function of the first application (Step S828).

In the present exemplary embodiment, the preset function may be, for example, a payment activity for transportation such as subways, trains, taxis, busses, and etc.

Specifically, the user may first perform the first motion on the mobile electronic device 700 and fingerprint registration, for example, 10 seconds before making a payment. Once the processor 740 successfully launches and logs into the eWallet account, the user may place the mobile electronic device 700 in front of a payment reader for making the payment. This allows the mobile electronic device 700 to be used akin to a credit card or a bank card that would ordinarily be carried in a wallet and yet with a higher level of security and convenience for a legitimate transaction.

The disclosure also provides a non-transitory computer readable medium, which records computer program to be loaded into a mobile electronic device to execute the steps of the aforementioned operating method. The computer program is composed of a plurality of program instructions (for example, an organization chart, establishing program instruction, a table approving program instruction, a setting program instruction, and a deployment program instruction, etc), and these program instructions are loaded into the mobile electronic device and executed by the same to accomplish various steps of the method for operating the mobile electronic device.

In view of the aforementioned descriptions, fingerprint data and at least one piece of motion data may be enrolled in the mobile electronic device in the disclosure, where each piece of the motion data is designated to a different action to be performed on the mobile electronic device. Once the user desires to perform a specific action on the mobile electronic device, fingerprint authentication in conjunction with motion authentication are requested to the user to deter an unauthorized access to run the application. Upon the validation of the authentication, the specific action will be automatically performed. The disclosure not only obviates the need to navigate through all the objects and/or multiple pages, but also provides a more secure and elegant approach to operate a mobile electronic device.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method for operating a mobile electronic device having a motion sensor, a touch sensor, a microcontroller, and a processor, comprising:
    detecting a motion by the motion sensor and a fingerprint by the touch sensor;
    generating motion data by the motion sensor in response to the detected motion and generating fingerprint data by the touch sensor in response to the detected fingerprint;
    comparing the generated motion data with at least one piece of enrolled motion data by the microcontroller and the generated fingerprint data with enrolled fingerprint data by one of the microcontroller and the processor, wherein the enrolled motion data and the enrolled fingerprint data are prestored in the mobile electronic device, and wherein the enrolled motion data comprises first motion data; and
    firstly, launching a first application when the generated motion data matches the first motion data and the generated fingerprint data matches the enrolled fingerprint data, secondly, associating the enrolled fingerprint data with login information of the first application to log into the first application, and finally performing a preset function of the first application by the processor.

2. The method of claim 1, wherein before the step of detecting the motion by the motion sensor and the fingerprint by the touch sensor, the method further comprises:
    enrolling and storing the enrolled fingerprint data in the mobile electronic device; and
    enrolling and mapping each piece of the enrolled motion data to a corresponding action and storing the enrolled motion data in the mobile electronic device.

3. The method of claim 1, wherein the motion is detected prior to the detection of the fingerprint, and wherein after the motion is detected, the method further comprises:
    detecting if any object is within a non-zero predetermined distance by a proximity sensor of the mobile electronic device; and
    if no, waking up the microcontroller from a microcontroller's sleep mode by the proximity sensor.

4. The method of claim 1, wherein the fingerprint is detected prior to the detection of the motion, and wherein after the fingerprint is detected, the method further comprises:
    detecting if any object is within a non-zero predetermined distance by a proximity sensor of the mobile electronic device; and
    if no, waking up the microcontroller from a microcontroller's sleep mode by the proximity sensor.

5. The method of claim 1, wherein after the step of generating the fingerprint data by the touch sensor in response to the detected fingerprint, the method further comprises:
    determining if a time period of the fingerprint staying on the touch screen exceeds a non-zero predetermined time by the microcontroller; and
    if yes, registering the generated fingerprint data by the microcontroller.

6. The method of claim 1, wherein the step of comparing the generated motion data with the enrolled motion data by the microcontroller and the generated fingerprint data with the enrolled fingerprint data by the microcontroller comprises:
  comparing the generated motion data with the enrolled motion data and the generated fingerprint data with the enrolled fingerprint data by the microcontroller; and
  waking up the processor from a processor's sleep mode by the microcontroller and unlocking the mobile electronic device by the processor when the generated motion data matches the first motion data of the enrolled motion data and the generated fingerprint data matches the enrolled fingerprint data.

7. The method of claim 1, wherein the step of comparing the generated motion data with the enrolled motion data by the microcontroller and the generated fingerprint data with the enrolled fingerprint data by the processor comprises:
  comparing the generated motion data with the enrolled motion data by the microcontroller;
  waking up the processor from a processor's sleep mode by the microcontroller when the generated motion data matches the first motion data of the enrolled motion data;
  comparing the generated fingerprint data with the enrolled fingerprint data by the processor; and
  unlocking the mobile electronic device by the processor when the generated fingerprint data matches the enrolled fingerprint data.

8. A mobile electronic device comprising:
  a motion sensor, detecting a motion and generating motion data in response to the detected motion;
  a touch sensor, detecting a fingerprint and generating fingerprint data in response to the detected fingerprint;
  a microcontroller, electrically coupled to the motion sensor and the touch sensor, and comparing the generated motion data with at least one piece of enrolled motion data; and
  a processor, coupled to the microcontroller, wherein one of the microcontroller and the processor compares the generated fingerprint data with enrolled fingerprint data, wherein the enrolled motion data and the enrolled fingerprint data are prestored in the mobile electronic device, wherein the enrolled motion data comprises first motion data, and wherein when the generated motion data matches the first motion data and the generated fingerprint data matches the enrolled fingerprint data, the processor firstly launches a first application, secondly associates the enrolled fingerprint data with login information of the first application to log into the first application, and finally performs a preset function of the first application.

9. The mobile electronic device of claim 8, wherein the processor further enrols and stores the enrolled fingerprint data in the mobile electronic device, and enrols and maps each piece of the enrolled motion data to a corresponding action and stores the enrolled motion data in the mobile electronic device.

10. The mobile electronic device of claim 8 further comprising:
  a proximity sensor, coupled to the microcontroller, detecting if any object is within a non-zero predetermined distance of the mobile electronic device, wherein if no, the proximity sensor wakes up the microcontroller from a microcontroller's sleep mode.

11. The mobile electronic device of claim 8, wherein the microcontroller determines if a time period of the fingerprint staying on the touch screen exceeds a non-zero predetermined time, wherein if yes, the microcontroller registers the generated fingerprint data.

12. The mobile electronic device of claim 8, wherein the microcontroller compares the generated motion data with the enrolled motion data and the generated fingerprint data with the enrolled fingerprint data, and wherein the microcontroller wakes up the processor from a processor's sleep mode and the processor unlocks the mobile electronic device when the generated motion data matches the first motion data of the enrolled motion data and the generated fingerprint data matches the enrolled fingerprint data.

13. The mobile electronic device of claim 8, wherein the microcontroller compares the generated motion data with the enrolled motion data, and the microcontroller wakes up the processor from a processor's sleep mode when the generated motion data matches first motion data of the enrolled motion data; and wherein the processor compares the generated fingerprint data with the enrolled fingerprint data, and the processor unlocks the mobile electronic device when the generated fingerprint data matches the enrolled fingerprint data.

14. A non-transitory computer readable medium, storing programs to be loaded into a mobile electronic device to perform steps of:
  detecting a motion by a motion sensor and a fingerprint by a touch sensor;
  generating motion data by the motion sensor in response to the detected motion and generating fingerprint data by the touch sensor in response to the detected fingerprint;
  comparing the generated motion data with at least one piece of enrolled motion data by a microcontroller and the generated fingerprint data with enrolled fingerprint data by one of the microcontroller and a processor, wherein the enrolled motion data and the enrolled fingerprint data are prestored in the mobile electronic device, and wherein the enrolled motion data comprises first motion data; and
  firstly, launching a first application when the generated motion data matches the first motion data and the generated fingerprint data matches the enrolled fingerprint data, secondly, associating the enrolled fingerprint data with login information of the first application to log into the first application, and finally performing a preset function of the first application by the processor.

15. A method for operating a mobile electronic device having a motion sensor, a touch sensor, a microcontroller, and a processor, comprising:
  detecting a motion by the motion sensor and a fingerprint by the touch sensor;
  generating motion data by the motion sensor in response to the detected motion and generating fingerprint data by the touch sensor in response to the detected fingerprint;
  comparing the generated motion data with at least one piece of enrolled motion data prestored in the mobile electronic device by the microcontroller;
  comparing the generated fingerprint data with enrolled fingerprint data prestored in the mobile electronic device by one of the microcontroller and the processor when the generated motion data matches any of the enrolled motion data; and
  firstly, launching a first application when the generated fingerprint data matches the enrolled fingerprint data and when the generated motion data matches first motion data of the enrolled motion data, secondly, associating the enrolled fingerprint data with login information of the first application to log into the first application, and finally performing a preset function of the first application by the processor.

16. A method for operating a mobile electronic device having a motion sensor, a touch sensor, a microcontroller, and a processor, comprising:

detecting a motion by the motion sensor and a fingerprint by the touch sensor;

generating motion data by the motion sensor in response to the detected motion and generating fingerprint data by the touch sensor in response to the detected fingerprint;

comparing the generated fingerprint data with enrolled fingerprint data prestored in the mobile electronic device by one of the microcontroller and the processor;

comparing the generated motion data with at least one piece of enrolled motion data prestored in the mobile electronic device by the microcontroller when the generated fingerprint data matches the enrolled fingerprint data, wherein the enrolled motion data comprises first motion data; and firstly, launching a first application when the generated motion data matches the first motion data, secondly, associating the enrolled fingerprint data with login information of the first application to log into the first application, and finally performing a preset function of the first application by the processor.

* * * * *